United States Patent
Adoline et al.

(10) Patent No.: US 7,174,804 B2
(45) Date of Patent: Feb. 13, 2007

(54) POSITIONING MECHANISM FOR TILT STEERING

(75) Inventors: Jack W. Adoline, Toledo, OH (US); Mark R. Thomas, Toledo, OH (US); Bruce J. Fondren, Ida, MI (US)

(73) Assignee: Associated Spring Raymond, Maumee, OH (US)

( * ) Notice: Subject to any disclaimer, the term of this patent is extended or adjusted under 35 U.S.C. 154(b) by 489 days.

(21) Appl. No.: 10/631,507

(22) Filed: Jul. 31, 2003

(65) Prior Publication Data

US 2004/0104566 A1 Jun. 3, 2004

(51) Int. Cl.
*B62D 1/18* (2006.01)

(52) U.S. Cl. .......................... 74/493; 280/775
(58) Field of Classification Search ................. 74/493, 74/494, 495; 280/775
See application file for complete search history.

(56) References Cited

U.S. PATENT DOCUMENTS

| | | | | |
|---|---|---|---|---|
| 1,643,588 | A * | 9/1927 | Ratigan | 267/70 |
| 4,126,302 | A | 11/1978 | Curnutt | |
| 4,162,062 | A * | 7/1979 | Strauss | 267/225 |
| 4,274,515 | A | 6/1981 | Bourcier De Carbon | |
| 4,328,960 | A | 5/1982 | Handke et al. | |
| 4,991,675 | A | 2/1991 | Tosconi et al. | |
| 5,095,581 | A | 3/1992 | Sarto | |
| 5,168,768 | A * | 12/1992 | Easton | 74/493 |
| 5,361,646 | A * | 11/1994 | Venable | 74/531 |
| 5,449,199 | A * | 9/1995 | Heinrichs et al. | 280/775 |
| 5,711,189 | A * | 1/1998 | Cartwright et al. | 74/493 |
| 5,730,239 | A | 3/1998 | Holter | |
| 5,816,614 | A * | 10/1998 | Kramer et al. | 280/775 |
| 5,890,556 | A | 4/1999 | Shearn et al. | |
| 5,975,228 | A | 11/1999 | Parfitt | |
| 6,220,406 | B1 * | 4/2001 | de Molina et al. | 188/275 |
| 6,279,951 | B1 * | 8/2001 | Cartwright et al. | 280/775 |

OTHER PUBLICATIONS

Patent Cooperation Treaty, International Search Report, Form PCT/ISA/210 (second sheet) (Jul. 1998).
New Generation of "Pedestal Steering Column" for Agricultural and Earth Moving Machines; CORAM Group, CORAM Engineering Services, Coram S.p.A- Engineering and Marketing Division, Via Cefalonia, 70, 25124 Brescia Italy; 2 pages.
Steering Columns for Off Highway Application; CORAM Group, CORAM Engineering Services, Coram S.p.A- Engineering and Marketing Division, Via Cefalonia, 70, 25124 Brescia Italy; 2 pages.

* cited by examiner

*Primary Examiner*—Richard Ridley
*Assistant Examiner*—Justin Krause
(74) *Attorney, Agent, or Firm*—Fay Sharpe Fagan Minnich & McKee; Brian E. Turung

(57) ABSTRACT

A positive lock mechanism having a compression spring rod with a housing, a rod member having an inner end in said housing and an outer end axially outwardly of a housing end. One or more compression springs extend between a guide member and an end of the housing. A positive locking mechanism is provided to prevent movement of the rod member in a longitudinal direction. The lock mechanism is controlled by a wire and cable assembly operated by a lever.

18 Claims, 14 Drawing Sheets

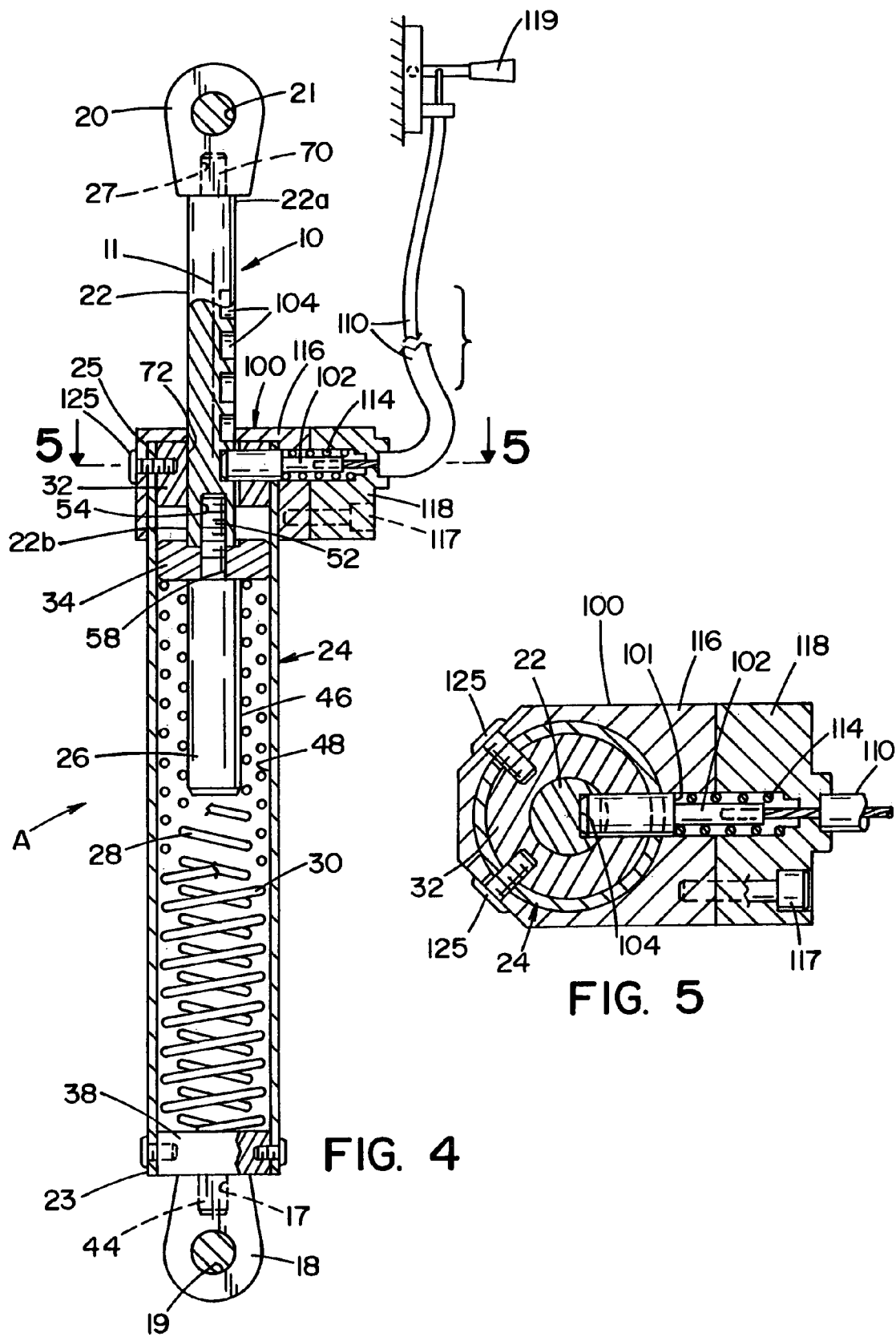

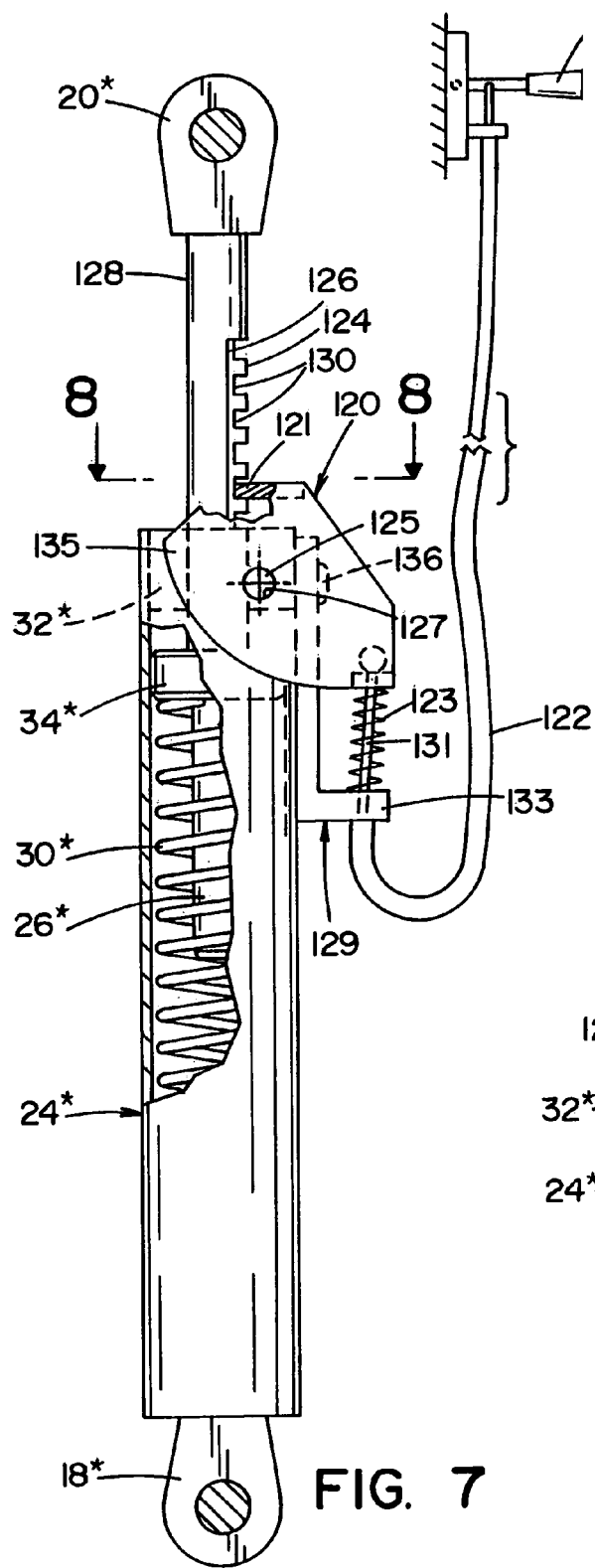
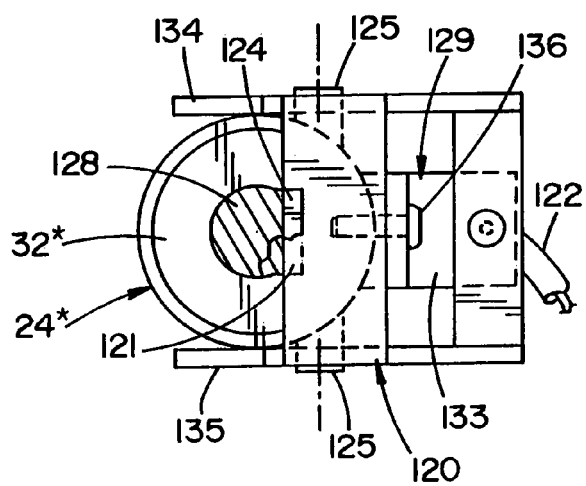
FIG. 7
FIG. 8

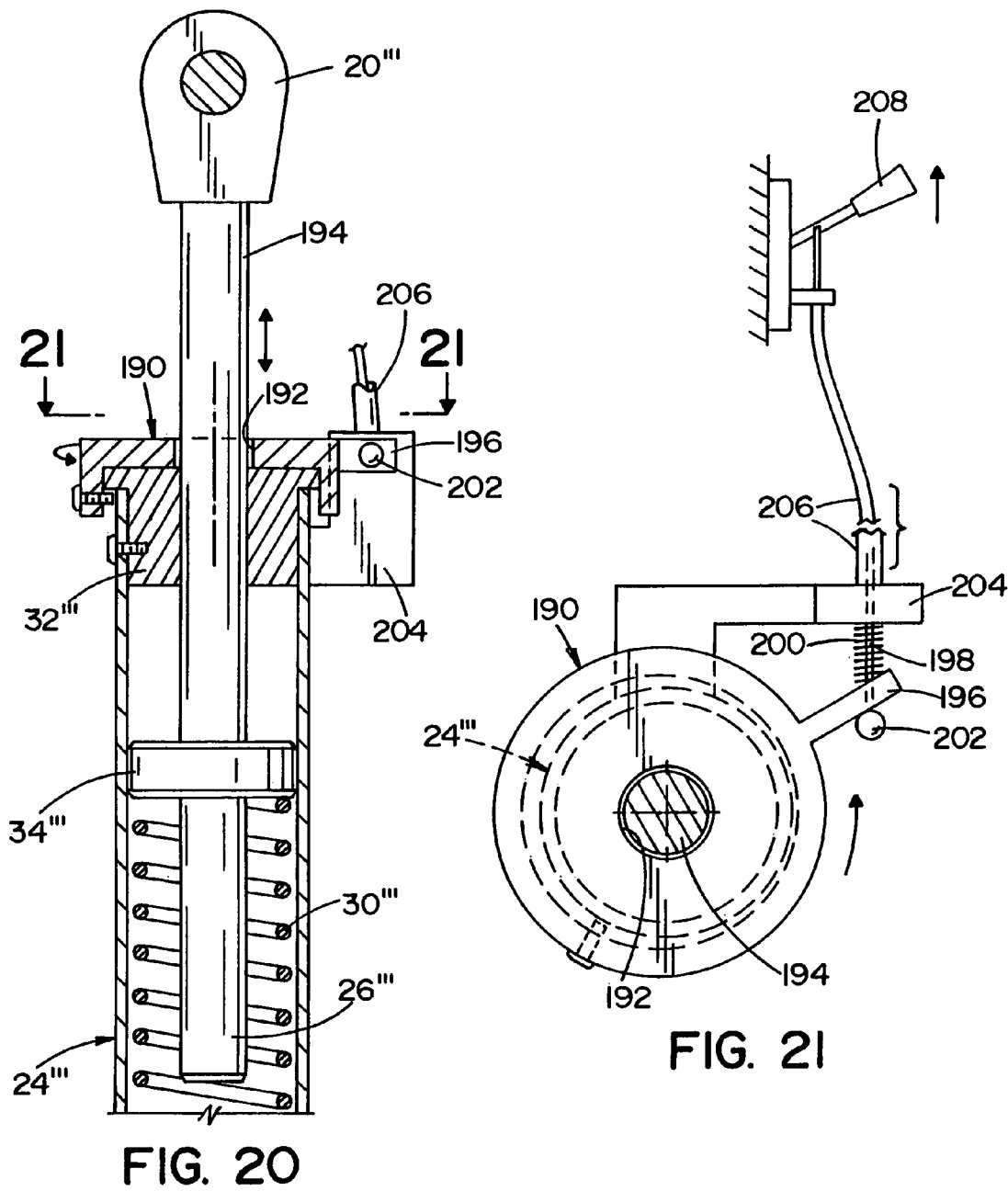

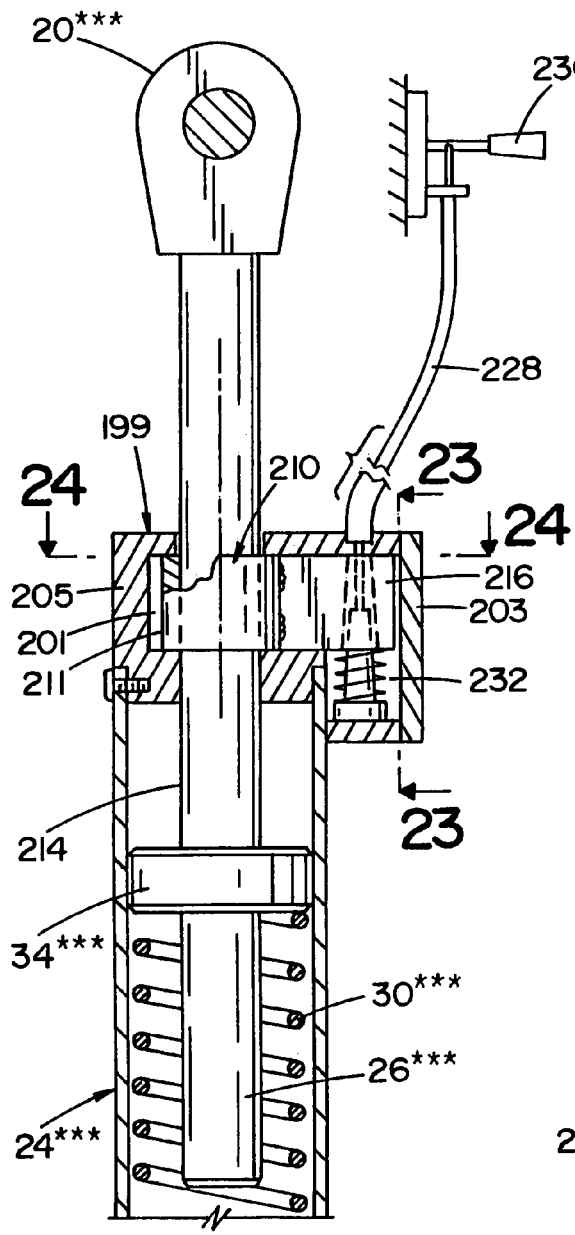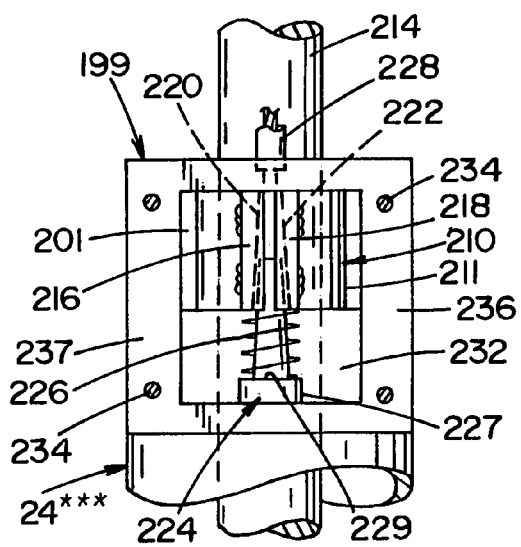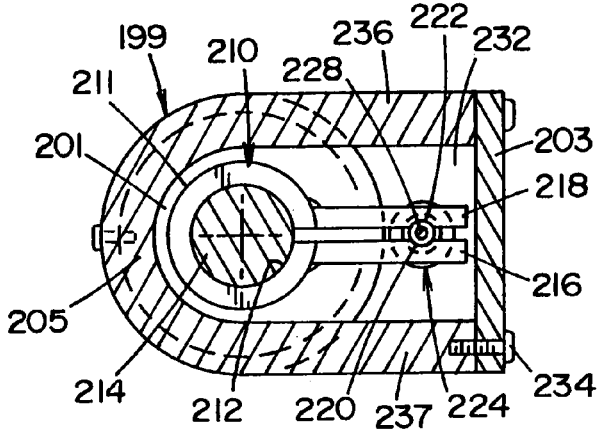
FIG. 22
FIG. 23
FIG. 24

POSITIONING MECHANISM FOR TILT STEERING

The present invention relates to compression spring rods, and more particularly, to a spring and rod assembly used in combination with a tilt steering wheel column to position and lock the steering wheel column into place.

The invention relates to a spring mechanism typically used for biasing hoods, tops, doors, hinged covers, and other elements from a closed to an open position. The invention involves the use of springs in conjunction with a rod member to exert the driving force on the elements to be displaced. The following patents are incorporated herein by reference as background information with regard to spring mechanisms: U.S. Pat. No. 6,199,843 to DeGrace; U.S. Pat. No. 5,810,339 to Küspert, et al.; and U.S. Pat. No. 4,962,916 to Palinkas.

Compression spring rods are used in various applications, for example, to assist in lifting, opening, and damping. Typical applications include lifting a lid hinged to a stationary base. Other applications include lifting and/or balancing elements for the trunk or hatchback of an automobile. The present invention uses the compression spring rod to adjust the position of a tilting steering column. A positive lock is used to lock the compression spring rod and thus the steering column into various positions which can be defined if desired.

Most applications involve the use of a pneumatic or gas spring to assist the motion of the spring. Many of these types of compression spring assemblies contain either gas or hydraulic fluid to control forces and piston speeds. Consequently, because these products contain a gas and/or fluid, they are subject to premature failure, due to the leakage of the gas or fluid over time. The leakage results in a loss of control forces and a subsequent loss of spring life. Accordingly, it is considered desirable to provide a new and improved spring assembly which overcomes the foregoing difficulties and others while providing better and more advantageous overall results.

SUMMARY OF THE INVENTION

The present invention provides an improved compression spring rod which overcomes the above referred-to difficulties and others with regard to such rods heretofore available. Advantageously, the compression spring assembly applies a constant and controlled force. The mechanism is able to support significant loads while maintaining strength over a greater number of operating cycles than existing pneumatic or gas spring designs. Further, the invention provides a purely mechanical compression rod assembly that can yield controllable forces over a long period of use and control the spring forces during both extension and compression. A positive locking mechanism is used to lock the compression spring rod into position.

In accordance with one aspect of the invention, a positive lock mechanism comprises a compression spring rod including a housing having a longitudinal axis and axially opposite ends, and a rod member coaxial with the axis and having an inner end in the housing and an outer end axially outwardly of one of the opposite ends. The rod member comprises at least one slot between the inner and outer ends thereof. A guide member on the inner end of the rod member supports the rod member during movement of the rod member. A pair of compression springs extends between the guide member and the same one of the opposite ends of the housing. A pin is selectively inserted into the slot for preventing movement of the rod member in a longitudinal direction. The pin extends within an opening in a housing member mounted adjacent one of the opposite ends of the housing.

In accordance with another aspect of the invention, a positive lock mechanism comprises a housing having a longitudinal axis and axially opposite ends. A rod member is coaxial with the axis and has an inner end in the housing and an outer end axially outwardly of one of the opposite ends. The rod comprises a plurality of slots along a longitudinal axis thereof. A guide member is adjacent an inner end of the rod for reciprocation axially of the housing between retracted and extended positions relative thereto.

A compression spring extends between the guide member and the same one of the opposite ends of the housing. A locking member which is slidably received within one of the plurality of slots prevents movement of the rod member.

In accordance with another aspect of the present invention, a tilt steering lock assembly comprises a tilt steering column comprising a first tilt section and a second tilt section. The first tilt section is operated by a manual lever connected thereto. A compression spring rod assembly comprises a housing having a longitudinal axis and axially opposite ends, and a pair of compression springs extending between the housing axially opposite ends. The rod member is coaxial with the axis and has an inner end in the housing adjacent the compression springs and an outer end axially outwardly of one of the opposite ends. The rod member comprises at least one slot between the inner and outer ends thereof. A pin is selectively inserted into the at least one slot for preventing movement of the rod in a longitudinal direction.

In accordance with yet another aspect of the invention, a positive lock mechanism comprises a compression spring and rod assembly, comprising a housing having a longitudinal axis and axially opposite ends and a rod member coaxial with the axis and having a first end in the housing and a second end axially outwardly of one of the opposite ends. A guide member on the first end of the rod member supports the rod member during movement of the rod member. A pair of compression springs extends between the guide member and the same one of the opposite ends of the housing. A rack comprises a plurality of teeth and a plurality of notches between the teeth within a keyway located in the rod along a longitudinal axis of the rod. A pawl assembly is pivotally mounted to the housing and has a first end and a second end, and a pawl tooth located adjacent the first end.

A pivot arm is located adjacent the second end of the pawl assembly. A spring is mounted around the pivot arm for biasing the pawl assembly in a locking position with respect to the rack.

In accordance with still yet another embodiment of the present invention, a positive lock mechanism comprises a housing having a longitudinal axis and axially opposite ends, and a rod member coaxial with the axis and having a first end in the housing and a second end axially outwardly of one of the opposite ends. The rod member comprises a knurled surface extending along a longitudinal axis of the rod. A guide member is provided on the first end of the rod member for supporting the rod member during movement of the rod member. A pair of compression springs extend between the guide member and the same one of the opposite ends of the housing. A pin extends within an opening in the housing. The pin comprises a first end and a second end. The second end has a knurled surface which engages the knurled surface of the rod to prevent movement of the rod in a longitudinal direction.

In accordance with another embodiment of the present invention, a positive locking mechanism comprises a compression spring and rod assembly including a housing having a longitudinal axis and axially opposite ends, and a rod member coaxial with the axis and having a first end in the housing and a second end axially outwardly of one of the opposite ends. A guide member is provided on the first end of the rod member for supporting the rod member during movement of the rod member. A compression spring extends between the guide member and the same one of the opposite ends of the housing. A collar assembly comprises a block mounted within one of the ends of the housing, the block has a threaded and tapered opening therein. A tapered collar has threads on an outer surface thereof. The collar comprises an opening for receiving the rod member. The collar is received within the threaded opening of the block. The collar has a first end and a second end. The first end has a diameter greater than the second end. The opening of the collar has a first end and a second end, wherein the first end has a diameter greater than the second end.

In accordance with another aspect of the invention, a positive locking mechanism comprises a compression spring rod assembly with a housing having a longitudinal axis and axially opposite ends. A rod member is coaxial with the axis and has an inner end in the housing and an outer end axially outwardly of one of the opposite ends. The rod member comprises a plurality of grooves between the inner and outer ends thereof. A guide member on the inner end of the rod member is provided for supporting the rod member during movement of the rod member. A compression spring extends between the guide member and the same one of the opposite ends of the housing. A round pin or ball is selectively inserted into one of the plurality of grooves for preventing movement of the rod member in a longitudinal direction. A wedge contacts the pin and moves the pin into engagement with one of the plurality of grooves. The wedge and the pin are received within a first opening in a block mounted to an end of the housing.

In accordance with yet another embodiment of the invention, a positive locking mechanism comprises a compression spring rod assembly with a housing having a longitudinal axis and axially opposite ends. A rod member is coaxial with the axis and has an inner end in the housing and an outer end axially outwardly of one of the opposite ends. A guide member is provided on the inner end of the rod member for supporting the rod member during movement. A compression spring extends between the guide member and the same one of the opposite ends of the housing. A block is mounted in one of the axially opposite ends of the housing. A plate is rotatably mounted on the block having a cammed opening therethrough for receiving the rod.

In accordance with still another aspect of the present invention, a positive locking mechanism comprises a compression spring rod assembly having a housing with a longitudinal axis and axially opposite ends, and a compression spring extending between the ends of the compression rod housing. A rod member is coaxial with the axis and has an inner end in the housing and an outer end axially outwardly of one of the opposite ends. A clamp assembly comprises a collar having an opening to receive the rod, and first and second arms extending from the collar. The arms each have a tapered slot. A wedge member is received by the tapered slots of the arms. A cable is connected to the wedge for moving the wedge into engagement with the tapered slots of the arms.

It is accordingly an object of the present invention to provide an improved compression spring rod with one or more springs for exerting an operating force on a displaceable member at a controlled rate.

Another object of the invention is the provision of a compression spring rod that supplies a consistent force over an extended period of time and maintains strength over a greater number of cycles compared to compression spring rods heretofore available.

Yet another object of the invention is the provision of a compression spring rod having at least two compression springs interrelated to produce a linear load versus deflection curve.

Yet another object of the invention is the provision of a compression spring rod having at least two compression springs interrelated to minimize load losses over time.

A further object of the invention is the provision of a mechanical compression spring rod assembly that provides an operating force that increases at a linear rate.

Yet a further object of the invention is to provide a mechanical compression spring assembly having one or more springs and a positive lock mechanism.

A still further object of the invention is to provide a compression spring tool and a positive lock mechanism for use with a tilt steering wheel column.

Still other aspects of the invention will become apparent to those skilled in the art upon reading and understanding the following detailed description.

BRIEF DESCRIPTION OF THE DRAWINGS

The foregoing and other objects and advantages will in part be obvious and in part pointed out in the following description taken together with the accompanying drawings in which:

FIG. 4 is a side elevational view in cross section illustrating the compression spring rod assembly with a locking pin mechanism in a locked position in accordance with a first embodiment of the present invention;

FIG. 5 is a top plan view in cross section of the compression spring of FIG. 4;

FIG. 7 is a side elevational view, in partial cross section, illustrating a compression spring rod with a locking pawl and rack mechanism in a locked position according to a second embodiment of the present invention;

FIG. 8 is a top plan view of the compression spring rod and locking mechanism of FIG. 7;

FIG. 20 is a side elevational view, in partial cross section, of the compression spring rod and locking mechanism of FIG. 18 in an unlocked position;

FIG. 21 is a top plan view of the assembly of FIG. 20;

FIG. 22 is a side elevational view, in partial cross section, of a compression spring rod and a clamp locking mechanism in a locked position in accordance with a seventh embodiment of the present invention;

FIG. 23 is an enlarged side elevational view, along line 23—23 illustrating the locking mechanism in a locked position;

FIG. 24 is a top plan view, in partial cross section, along line 24—24, illustrating the locking mechanism in the locked configuration;

DESCRIPTION OF THE PREFERRED EMBODIMENTS OF THE INVENTION

Figure 1:
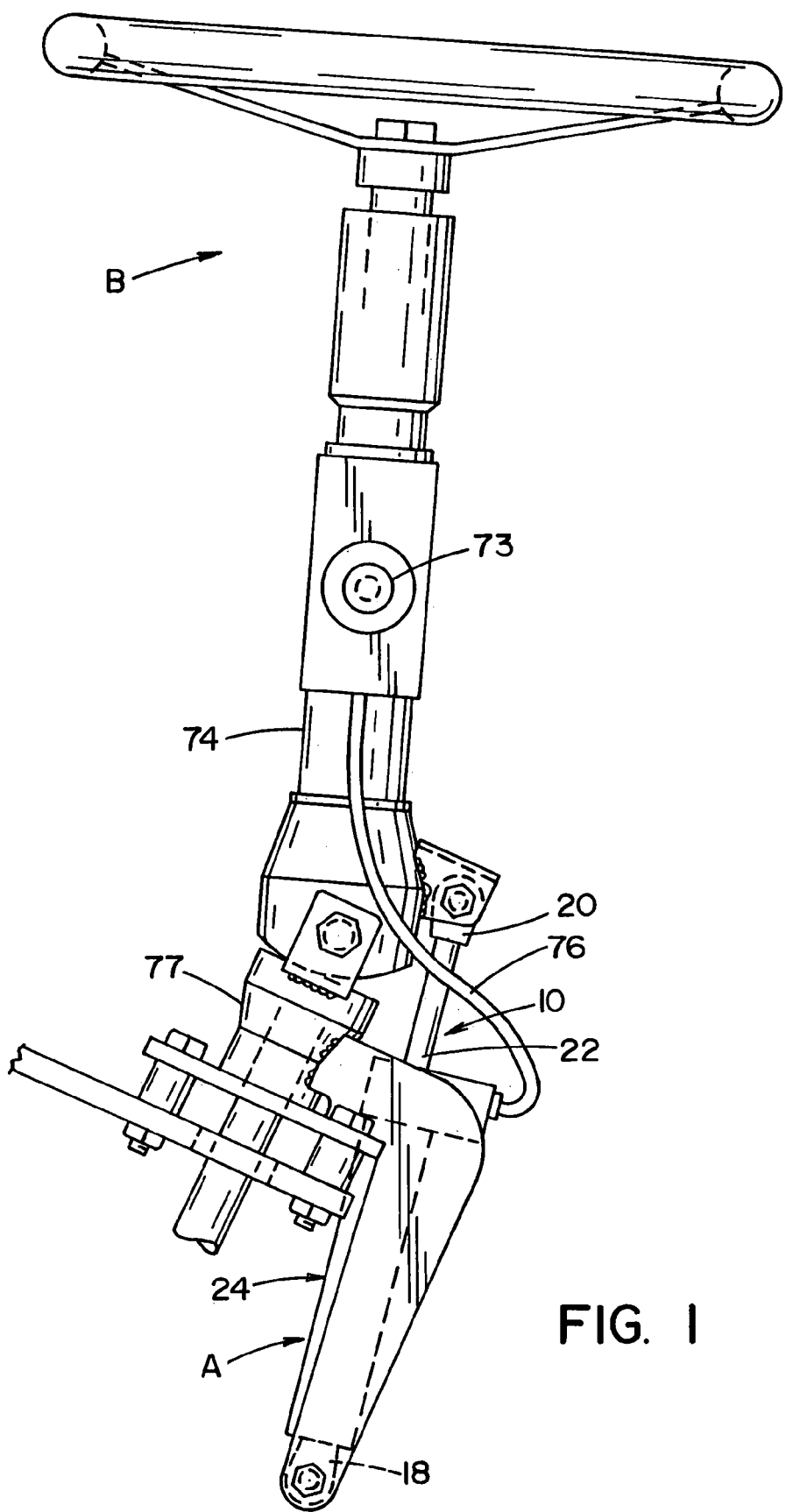
FIG. 1 is a side elevation view, of a tilt steering wheel column with a compression spring rod in accordance with the present invention.

Referring now in greater detail to the drawings, wherein the showings are for the purpose of illustrating preferred embodiments of the invention only, and not for the purpose of limiting the invention, a compression spring rod assembly A in accordance with a preferred embodiment has a compression spring rod 10, in accordance with the invention, as shown in FIG. 4, has an axis 11 and includes a rod member 22 which is axially extendable and retractable relative to a one-piece tubular housing 24. Rod 22 has an outer end 22a and an inner end 22b connected to a guide rod 26. Guide rod 26 extends axially inwardly of inner end 22b of rod 22 and is surrounded by a first compression spring 28 which is supported by the exterior surface 46 of guide rod 26 against buckling. First compression spring 28 is surrounded by a second compression spring 30 which is supported against buckling by the interior surface 48 of housing 24. Springs 28 and 30 are wound opposite to one another. An outside diameter of compression spring 28 is less than an outside diameter of compression spring 30. Alignment of compression springs 28 and 30 relative to one another and axis 11 is maintained by the exterior surface 46 of guide rod 26 in conjunction with the interior surface 48 of housing 24. Housing 24 has a mounting end 23 and an outer or opposite end 25, and compression springs 28 and 30 are axially captured between a tail bushing 38 at mounting end 23 and a guide member 34 mounted between guides rod 26 and the inner end 22b of rod 22. The compression spring biases the rod 26 toward an extended position. The bushing 38 supports the rod for reciprocation axially between extended and retracted positions relative to the housing.

Compression spring rod 10 involves the use of a one-piece housing 24 which facilitates smooth movement of lift rod 22 and compression springs 28 and 30 during operation of the spring rod. Tail bushing 38 has a threaded stud 44 which is received in a threaded recess 17 in a mounting element 18. Guide rod 26 includes a threaded stud 52 at the outer end thereof which passes through an opening 58 in guide member 34 and into a threaded bore 54 provided therefore in rod 22. Lift rod 22 passes through an opening 72 through a rod bushing at outer end 25 of housing 24, and has a threaded stud 70 on outer end 22a thereof which is received in a threaded recess 27 provided therefore in a mounting element 20.

Mounting elements 18 and 20 have openings 19 and 21 therethrough, respectively, for receiving a variety of different mounting components common in the industry including, for example, pins, bolts, swivels, and the like. Advantageously, the threaded studs 44 and 70 at opposite ends of the spring rod assembly provide for accommodating the use of different mounting elements than those shown so as to modify the assembly for use in a variety of structural environments.

Guide member or plug 34 is slidable in housing 24 and includes a guide ring of suitable material to facilitate such sliding movement. Rod 22 is slidably supported at end 25 of housing 24 by a rod bushing 32 and can be secured to the housing by a pair of set screws having inner ends received in an annular recess in the rod bushing. At full extension, rod 22 is cushioned by a rod bushing and an impact absorbing metal spring ring (not shown) received in a recess at inner end 22b of rod 22 adjacent the axially outer face of guide member 34. When rod 22 is fully extended, the spring ring engages in a recess in the axially inner end of a rod bushing. Lubrication can be provided in housing 24 to facilitate the sliding movement of guide member 34 therein. Guide member 34 and a rod bushing support rod 22 for reciprocation in housing 24 such as to maintain minimal breakaway forces for rod 22. Additionally, guide member 34 and rod bushing 32 keep rod 22 coaxial with axis 11 and decrease the effect of side loading on the assembly.

Compression spring rod 10, through the multiple spring rate characteristics of compression springs 28 and 30, serves to provide smooth extension forces to the movement of lift rod 22 from the retracted to the extended position thereof relative to housing 24. Depending upon the application, the appropriate load versus deflection can be determined and the corresponding physical and elastic properties of the combination of compression springs 28 and 30 can then be ascertained. The compression springs 28 and 30 can each be fabricated from spring material, such as music wire, and, for example, ASTM A228 or 302 stainless steel. Each compression spring 28 and 30 has a different stress and strain characteristic.

The compression spring rod can be used with a pedestal or tilt steering column for agricultural or earth-moving machines, such as tractors, harvesters, combines, excavators, etc. Alternatively, the compression spring rod can be used with a tilt steering column of a passenger car, truck, etc.

Figure 2:
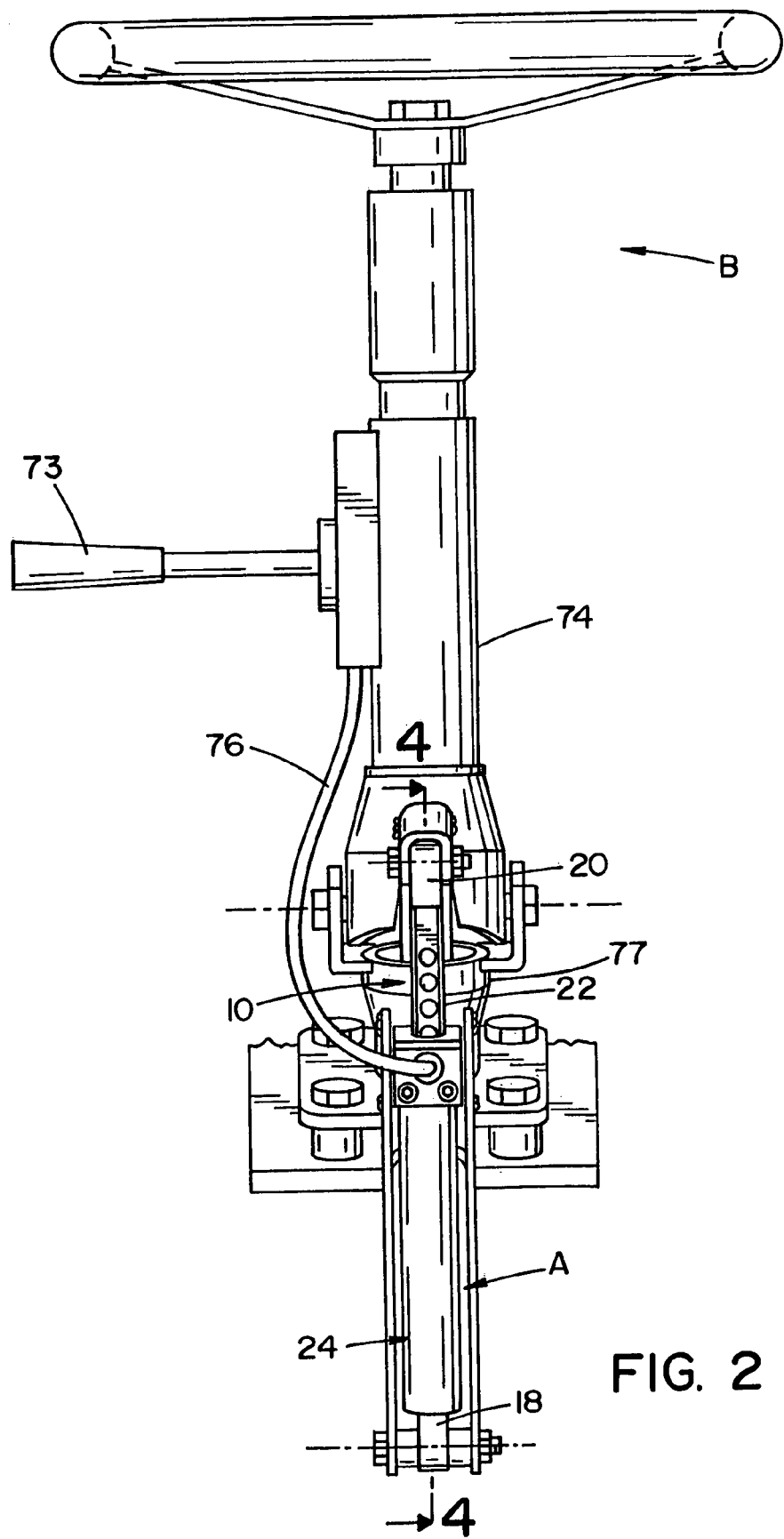
FIG. 2 is a side elevational view, rotated 90° from FIG. 1, of the compression spring rod and the steering wheel column.
Figure 3:
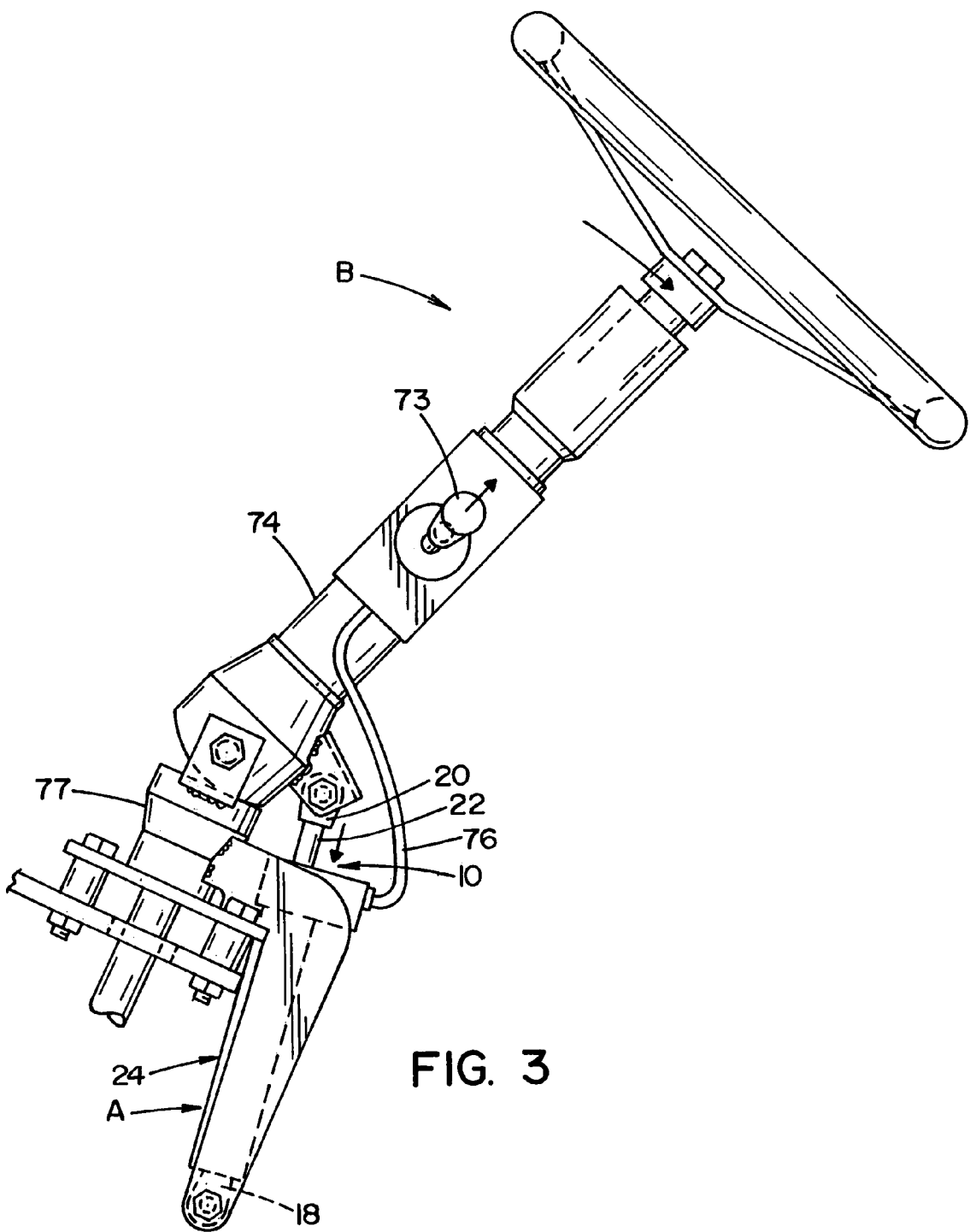
FIG. 3 is a side elevational view of the steering wheel column of FIG. 1 illustrating compression of the spring and tilting of the steering wheel.

Referring now to FIGS. 1–3, a tilt steering column B used inside cabs of harvesters, tractors, excavators, etc. provides to a driver multiple possibilities of adjustment with telescopic and tilting movements. Telescopic adjustment can be operated by a knob integrated in the middle of the steering wheel, that releases the vertical movement with a simple rotation of 90° of the knob. The driver can then adjust the height of the steering wheel.

Alternative methods can be provided for the vertical adjustment to the steering column, for example, machines in which different workers are using the same machine for many hours to allow them to maintain their spine in a correct position.

Tilting adjustment can be operated by a compression spring rod assembly 10 described above that moves the column of the steering column in a smooth manner, providing the operator a comfortable sensation when adjusting the steering column.

Two different tilting sections of the steering column include a first tilting section 74 close to the steering wheel operated by a hand lever 73 that can be easily moved with a soft touch of the fingers, and a second tilting section 77 which is close to the floor mat of the cab and is operated by a pedal (not shown). Lever 73 is connected by a wire or cable assembly 76 to the compression spring rod assembly 10.

In the lower part of the column an elastic joint can be provided to reduce the vibrations and the noise coming from the engine and from the steering pump. The upper shaft or first tilting section 74 of the steering column is provided with an interface to fit the steering wheel and include self canceling cams for the turning signal. For extreme inclination a double u-joint can be provided to eliminate the effect of the simple u-joint over 30° of inclination.

Figure 6:
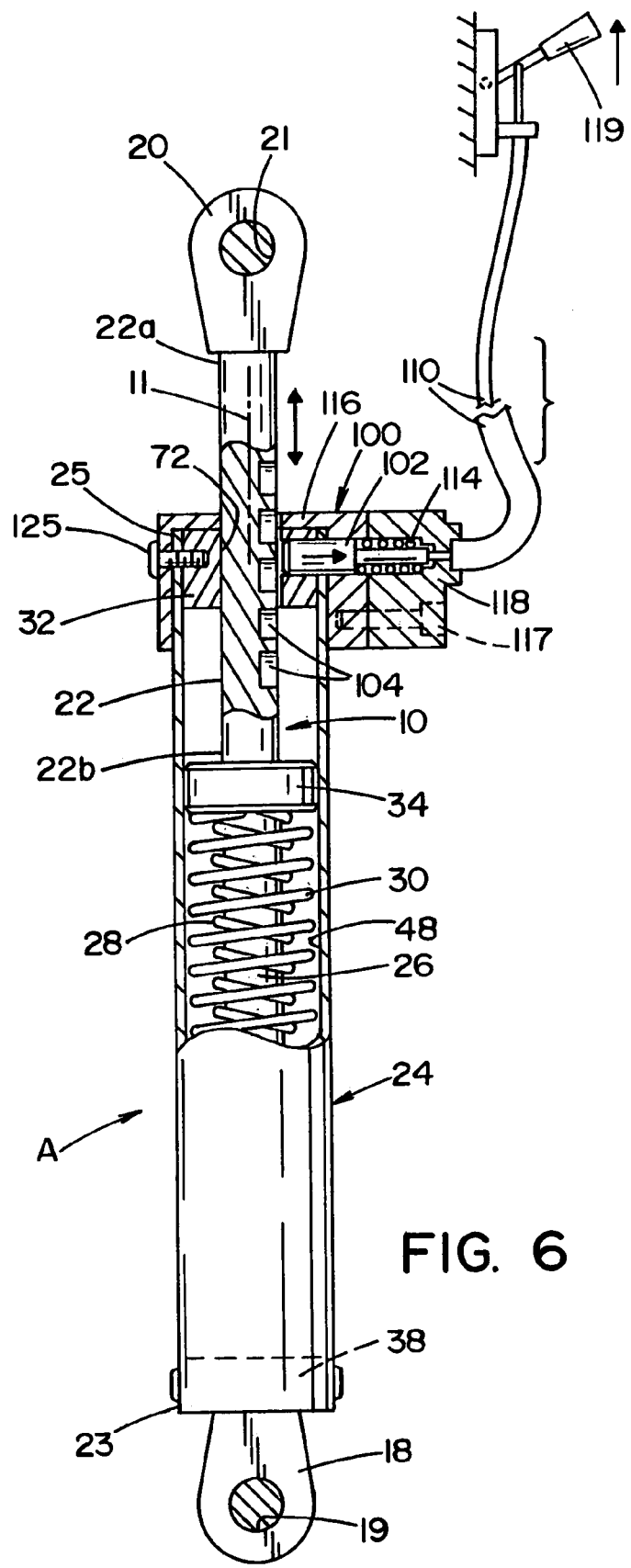
FIG. 6 is a side elevational view, in partial cross section, illustrating the compression spring with the locking pin in the unlocked position.

A positive lock mechanism is used with the compression spring rod to lock the spring rod and tilt steering column in a particular position. Referring now to FIGS. 4 through 6, a position locking mechanism 100 according to a first preferred embodiment of the present invention is provided to specifically control the locking position of the compression spring rod to control the overall length and movement of the compression spring rod assembly.

The first embodiment utilizes a spring loaded locking pin 102, which can be fabricated from hardened steel, which mates with one of spaced apart holes 104 in the spring rod 22. The pin can be round or square in configuration and is inserted into a corresponding round or square hole. The slots or holes 104 can be equally spaced apart on rod 22.

Actuation of the pin is accomplished via a wire and cable assembly 110 embedded in the pin and held in place via several set screws or other suitable fasteners and a spring 114 which is held captive within openings of top and bottom housings 116, 118 and the end housing 24 between top housing 116 and a shoulder 101 on the pin. The spring 114 biases the pin in a locking position. The openings in the top and bottom housings and the rod housing are aligned with each other. The pin travels through a bottom housing 118, housing 24 and plug 34 before engaging the rod 22. The top and bottom housing can be secured together via a screw 117 or other suitable fastener. The top housing 116 is positioned over an end of the housing 24 and is secured to the housing via several screws 125 or other suitable fasteners. When the locking pin is aligned with a specific hole in the rod assembly, the spring 114 applies a force in the direction of the centerline of the pin, thus forcing the pin into a locked position. The pin can be released by pulling a lever 119 or a similar mechanism spaced apart from the compression spring rod assembly and connected to the wire and cable assembly. As seen in FIG. 6, when the lever is operated, the pin 102 is pulled out of engagement with hole 104 of rod 22, compressing the spring 114 and allowing the rod to move freely in the vertical direction.

Figure 9:
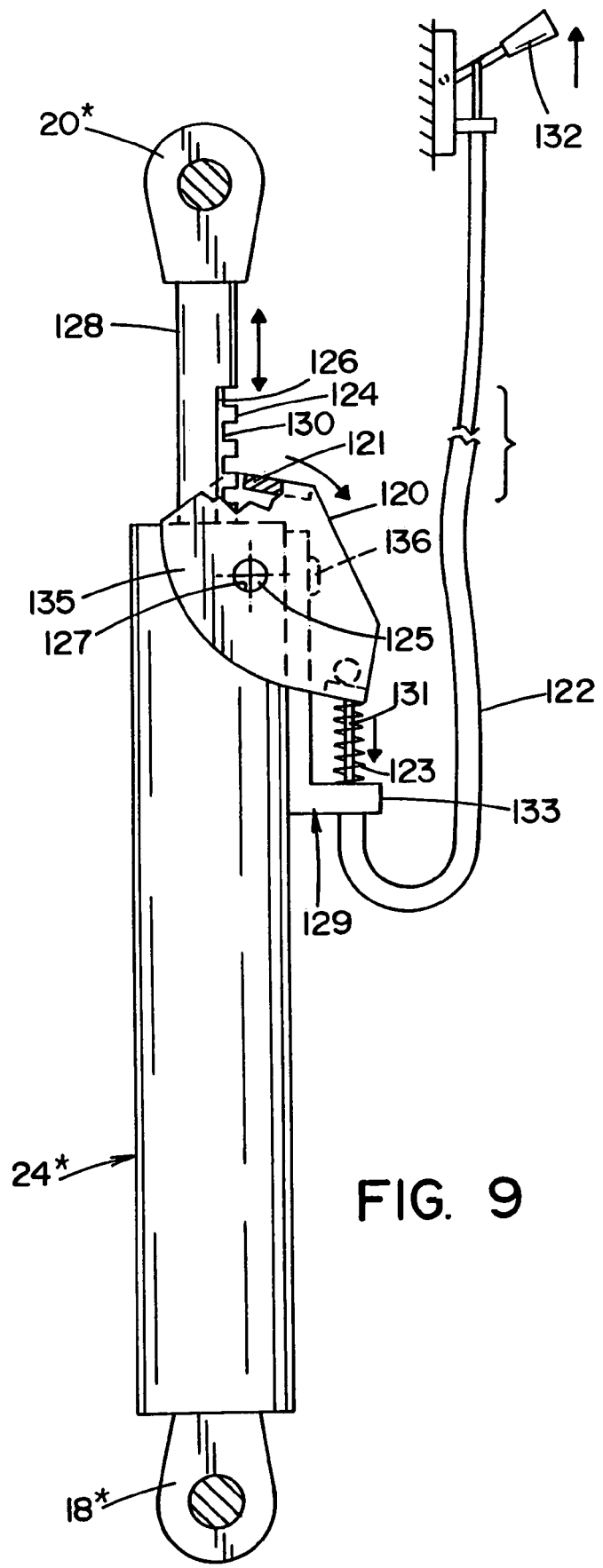
FIG. 9 is a side elevational view of the compression spring rod and locking mechanism of FIG. 7 with the locking mechanism in the unlocked position.

Referring to FIGS. 7–9, a locking mechanism according to a second preferred embodiment is illustrated. The compression spring rod assembly used with this embodiment is substantially as described for FIGS. 1–6. Like components are designated with like numerals followed by an asterisk (*). The locking mechanism includes a pawl assembly 120 having a pawl tooth 121 at a first end thereof and a cable 122 spring loaded via a spring 123. The pawl assembly is used with a rack 124 pressed into a keyway 126 in compression spring rod 128 and which is retained with set screws or other suitable fasteners. The rack and pawl can be fabricated from hardened steel or another suitable material. The rack has a plurality of notches 130 which are spaced apart to prevent movement of the rod 128.

As shown in FIG. 7, the notches 130 are positioned equally spaced apart; however, other configurations may be used. The notches and the pawl are illustrated to be rectangular in shape, however, other shapes such as square or circular configurations could also be used.

As seen in FIG. 8, the pawl assembly has two side walls 134, 135 on opposite sides of the rod housing 24*. The pawl assembly 120 is rotatably mounted to the rod housing 24* via a pin 121 extending through a hole 127 in the housing. A preferably L-shaped bar member 129 is mounted to a side of the housing 24* via a fastener 136 and has a ledge 133 on which a post or pivot arm 131 is mounted. The post is mounted at a second, opposite end of the pawl assembly 120 as the pawl tooth. The spring 123 extends over the post 131. The post is able to pivot to accommodate rotation of the pawl.

FIG. 7 illustrates the pawl tooth 121 engaging one of the notches 130 in the rack to prevent the rod from moving in an axial direction. FIG. 9 shows the pawl disengaged from the rack so that the rod can move freely in the vertical direction. Lever 132 is pulled in an upward direction which pulls the cable 122 and compresses spring 123, thus pivoting the pawl assembly away from the rack and releasing engagement of pawl tooth 121 with notch 130 in rod 128, thus allowing the rod to move in the axial direction.

Figure 10:
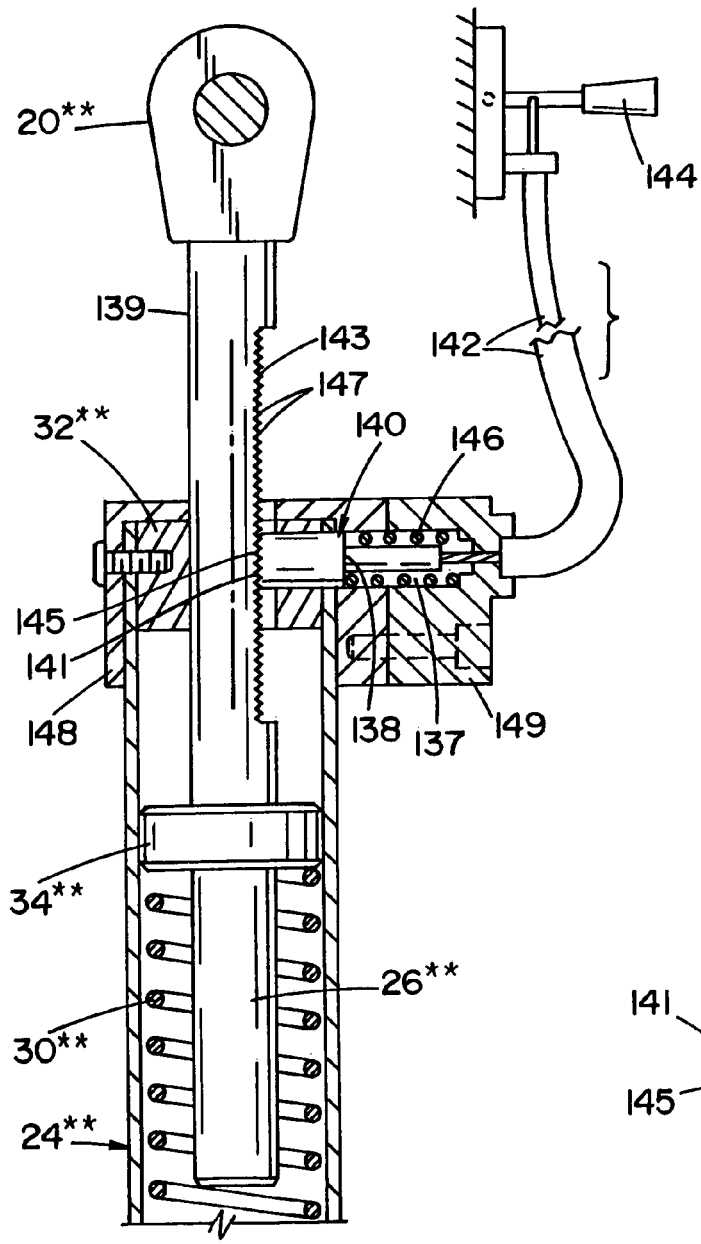
FIG. 10 is a side elevational view, in cross section, illustrating a compression spring rod and a knurled locking mechanism in a locked position in accordance with a third embodiment of the present invention.
Figure 11:
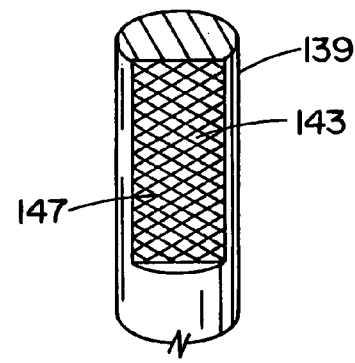
FIG. 11 is a side elevational view of the rod of FIG. 10 with an indented knurled section.
Figure 12:
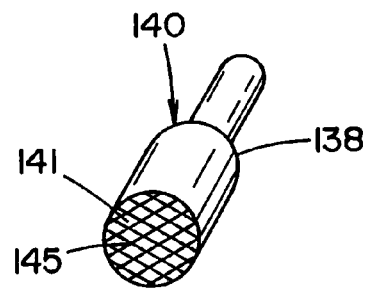
FIG. 12 is a perspective view of a locking pin with a knurled portion which engages the knurled section of the rod of FIG. 10.

FIGS. 10–12 illustrate a third embodiment of a locking mechanism for the compression spring rod. Like components to those shown in FIGS. 1–6 are designated with numerals with a double asterisk (). A spring loaded pin 140 is connected at a first end to the wire and cable assembly 142 which is controlled by a lever 144. Compression spring rod 139 has an indented surface or keyway extending along a longitudinal axis which has a knurled surface 143 with a plurality of teeth 147** thereon.

The pin 140 has a knurled surface 141 with teeth 145 at a second end which engages a corresponding knurled surface 143 with teeth 147 of the compression spring rod formed in the keyway along a longitudinal axis thereof. The pin is pushed into contact with knurled surface 143 of the rod by spring 146. FIG. 10 shows the locking mechanism in a locked position.

A housing formed of two members 148, 149 is positioned over an end of the compression rod housing 24. An opening or hole 137 extends through members 148, 149 for receiving the pin 140 and spring 146. The spring is captured between an end of hole 137 and a ledge 138 formed on an end of the pin 140. The pin also extends into an opening within bushing 32.

If the lever 144 is lifted or pulled upwardly, the pin 140 moves out of engagement with the knurled slot 143 and compresses the spring 146. Thus, the rod 139 is able to move in an axial direction. If the lever is pulled downwardly, the spring returns to its extended position, thus pushing the pin into locking engagement with the slot.

Figure 13:
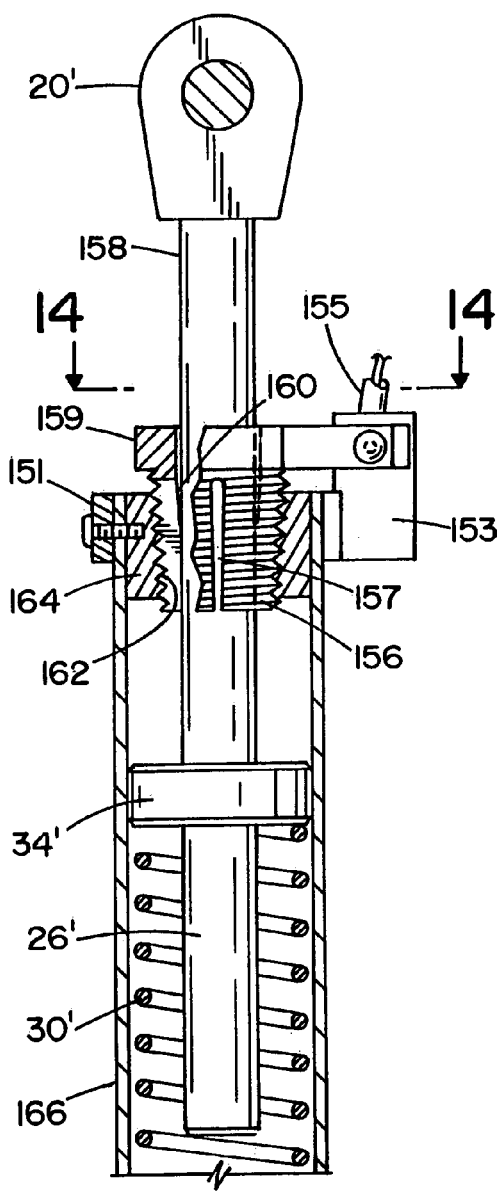
FIG. 13 is a side sectional view, in partial cross section, of a compression spring rod and a threaded locking mechanism in accordance with a fourth embodiment of the present invention.
Figure 14:
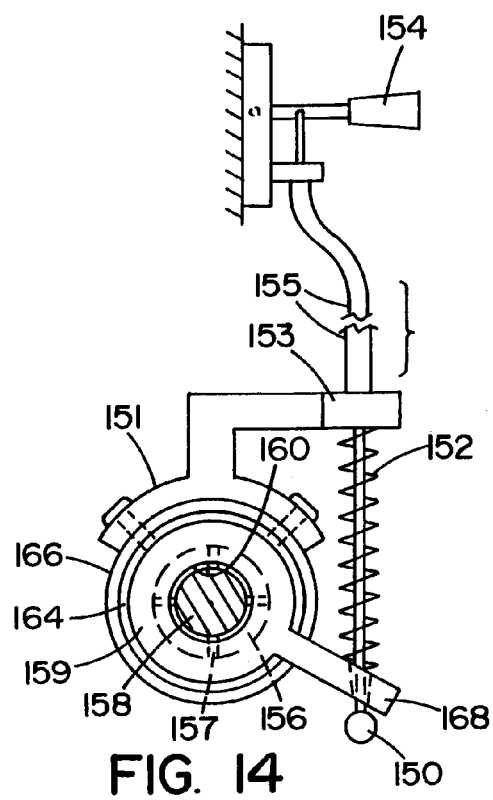
FIG. 14 is a top plan view of the locking mechanism of FIG. 13 in a locked position.
Figure 15:
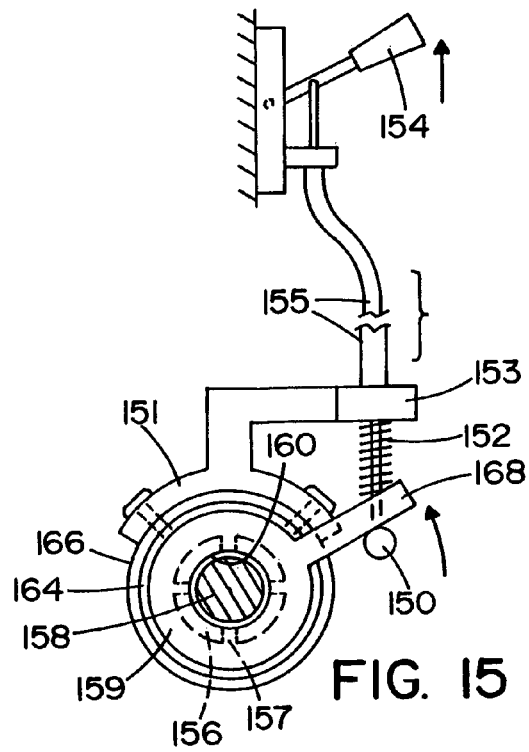
FIG. 15 is a top plan view of the locking mechanism of FIG. 13 in an unlocked position.

FIGS. 13–15 illustrate a fourth embodiment of a locking mechanism for the compression spring rod. Like components to those shown in FIGS. 1–6 are labeled with numerals with a single prime ('). The locking mechanism includes an arcuate plate 151 which is fastened via a fastener or other means through at least one hole to an outer surface of rod housing 166. The plate further has an arm 153 which extends therefrom. A wire and cable assembly 155 extends from the arm and is connected to a lever 154. An elongated rod or pin 150 is spring loaded via spring 152 and is remotely operated by lever 154. A threaded, tapered collar 156 is mounted adjacent compression spring rod 158 via slots 157 along a longitudinal axis and has a tapered inner wall 160 which is tightened against rod 158 during rotation of the collar. The inner wall 160 has a first end and a second end, where the first end has a diameter greater than the second end. The collar is positioned within a threaded and tapered opening 162 of bushing or block 164 positioned within the spring rod housing 166.

FIG. 14 illustrates the threaded collar in the locked position squeezing or tightening down on rod 158. In this position, the lever 154 is pulled downwardly, extending the spring and rod. Arm 168 is rotated clockwise extending the spring surrounding the spring rod 158 is a circular member or plate 159 which has an opening for the rod. The plate 159 has an arm 168 which extends therefrom and has an opening for receiving the pin 150. The plate 159 and arm 168 are positioned above an end of rod housing 166 and plate 151. Projecting downwardly from the plate 159 is threaded collar 156. The spring 152 biases the collar in the locked position. Referring to FIG. 15, when lever 154 is pulled upwardly, the spring compression rod 158 pivots arm 168 in a counter-clockwise manner thus releasing engagement of the collar with rod 158, allowing the rod to freely move in the vertical direction. The spring is compressed and the collar is released from engagement from the rod.

Figure 16:
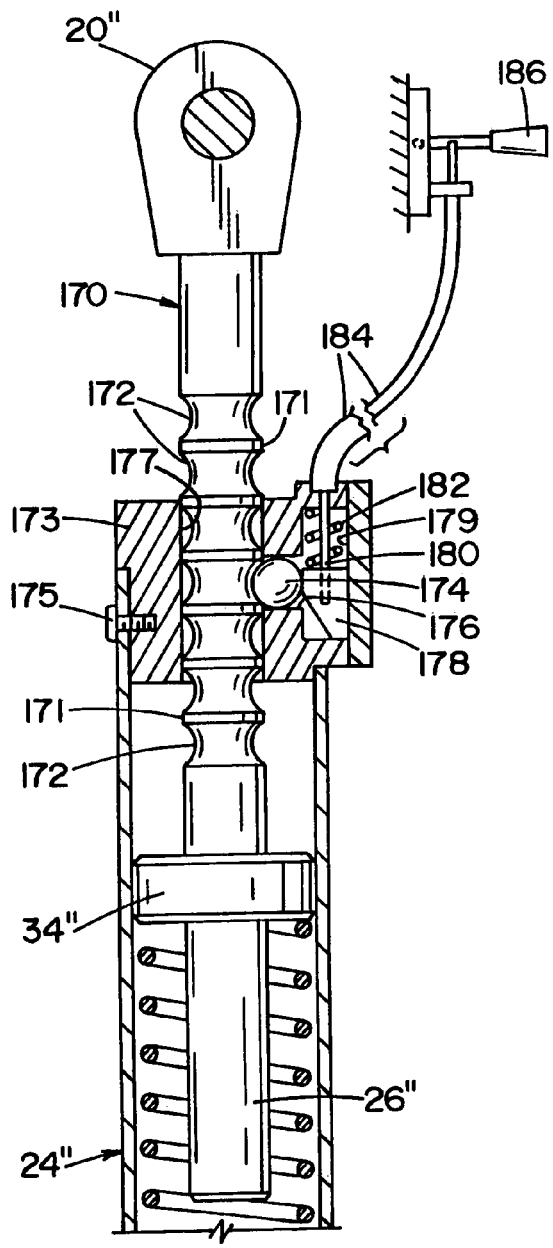
FIG. 16 is a side elevational view, in partial cross section, of a compression spring rod and a locking mechanism in accordance with a fifth embodiment of the present invention in a locked position.
Figure 17:
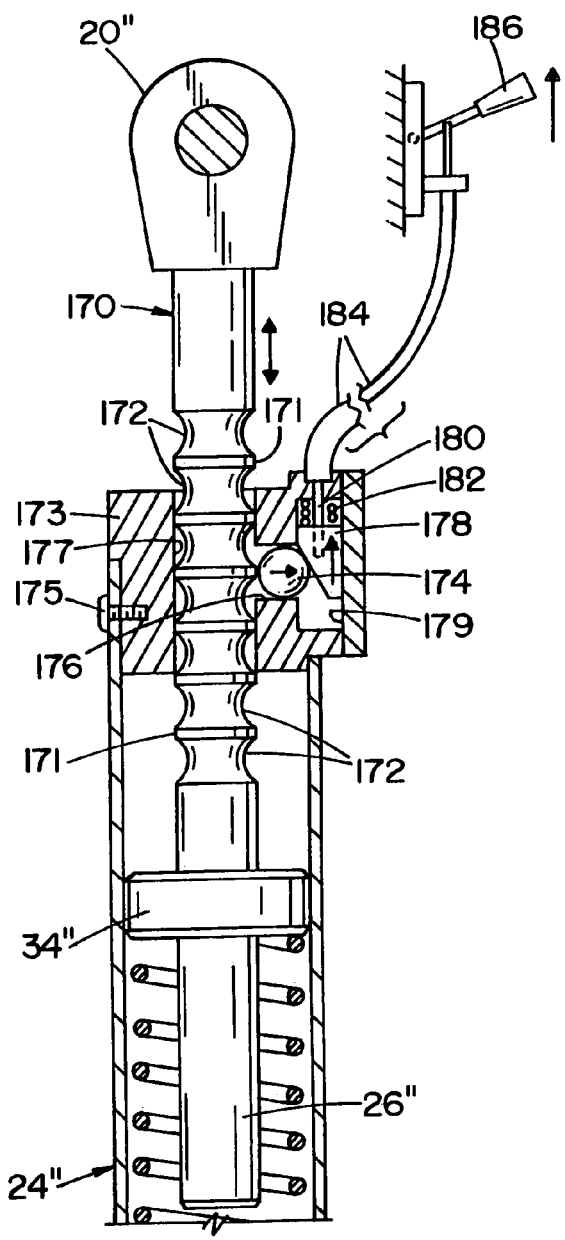
FIG. 17 is a side elevational view, in partial cross section, illustrating the compression spring rod and the locking mechanism of FIG. 16 in an unlocked position.

Referring to FIGS. 16 and 17, a fifth embodiment of the locking mechanism is illustrated. Like components to those illustrated in FIGS. 1–6 are designated with a double prime ("). A spring compression rod 170 has a series of indented grooves or curved surfaces 172 extending along a longitudinal axis, which engage a ball or round pin 174 which is retained within a slot 176 by a wedge shaped block 178. The grooves 172 each have a concave portion extending around a perimeter of the rod. A block 173 is inserted into an end of the compression spring housing 24" and mounted thereto via a fastener 175 or other suitable means.

The block has a first opening 177 for receiving the spring rod 170. A second opening or slot 176 extends from and is oriented perpendicular to opening 177 along a longitudinal axis of the block. A third opening or slot 179 extends from slot 176 and is parallel to slot 177. Opening 179 has two walls which capture spring 182 and wedge shaped block 178. Arm 180 attaches at one end to the wedge shaped block and at an opposite end to wire and cable assembly 184. The wire and cable assembly is controlled by lever 186.

The spring rod 170 has a plurality of indented notches or curved surfaces 172 extending along a longitudinal axis thereof. A flat portion 171 is formed between each notch. The wedge 178 is attached to an arm 180 spring loaded via spring 182 and which is connected to wire and cable assembly 184 controlled by lever 186.

When the lever is pulled upwardly or in a counter-clockwise manner, the arm is pulled upwardly thus spring loading the arm by compressing the spring and pulling wedge 178 upwardly and allowing the ball to be released from the notch 172 in the rod 170. Then, the rod and compression spring can move in the vertical or longitudinal direction. To secure the rod in a vertical position the lever is released or rotated in a clockwise manner, and spring 182 pushes the wedge downwardly thus pushing the ball 174 into contact with a notch 172 in the rod thus locking the rod into position and preventing longitudinal movement.

FIGS. 18–21 illustrate a sixth embodiment of the present invention. A locking device 190 in the form of an eccentric cam is shown.

Like the components to those illustrated in FIGS. 1–6 have like numerals marked with a triple prime ("'). In this embodiment, the locking device is in the form of an eccentric cam assembly 190 which is positioned over an end of the rod housing 24"' and is positioned over bushing or block 32"'. The cam has a recess for receiving a top surface of the block. The cam plate 190 has an opening 192 which receives and is offset with respect to rod 194 of the compression spring. The cam further has an arm 196 which extends from the body of cam 190 and which is attached to a spring loaded pin 198. The pin 198 has a spring 200 which surrounds the pin and extends from an end 202 of the pin to an extension member 204 extending from the block. The pin is further attached to a wire or cable assembly 206 which is remotely operated by a lever 208 connected thereto.

Figures 18, 19:
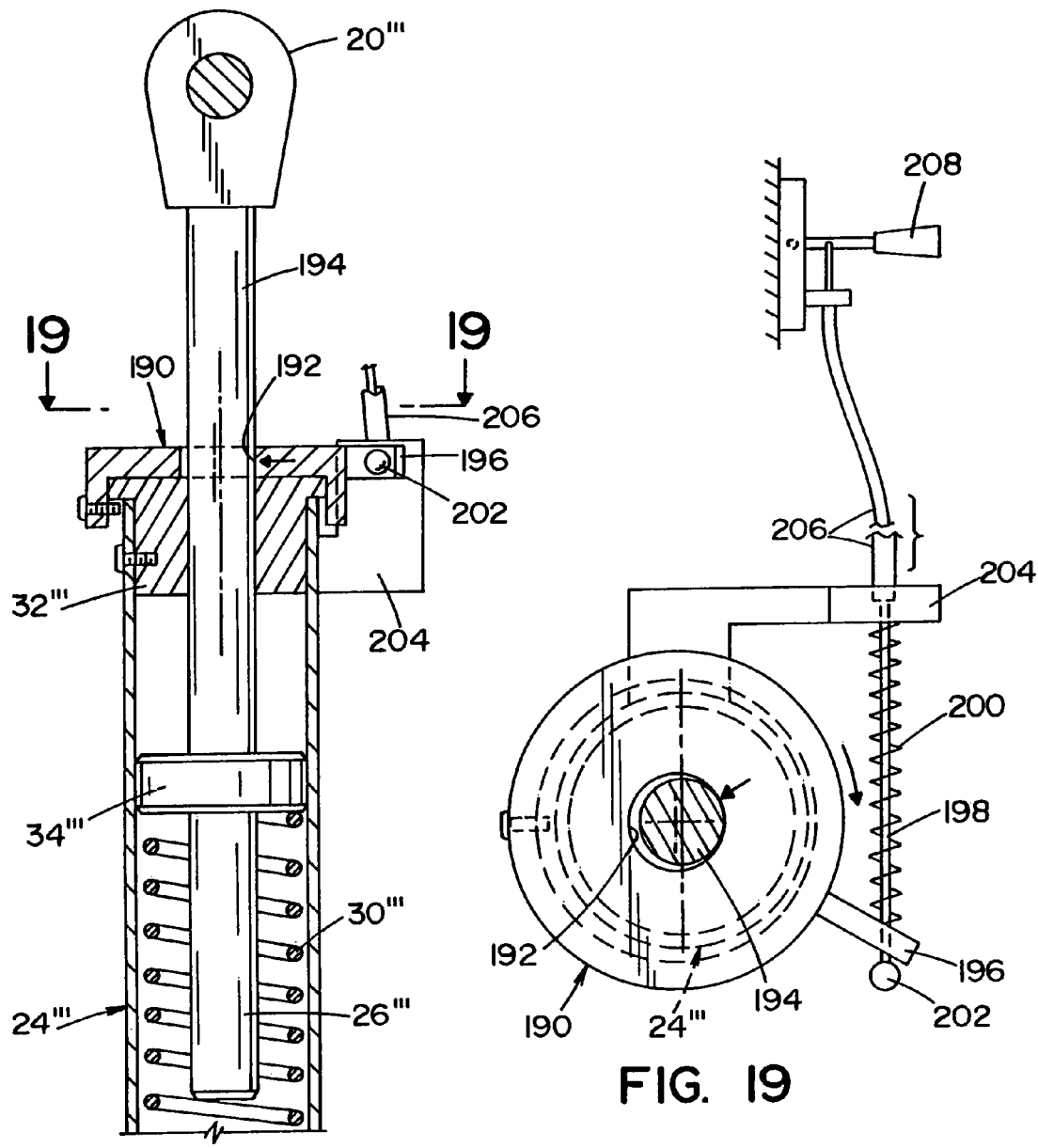
FIG. 18 is a side elevational view, in partial cross section, of the compression spring rod and a cam locking mechanism in a locked position, in accordance with a sixth embodiment of the present invention.
FIG. 19 is a top plan view of the assembly of FIG. 18.

The spring 200 biases the pin 198 and cam 190 in a locked position. FIGS. 18 and 19 illustrate the cam and rod assembly in a locked position. The spring 200 is biased to move or rotate the cam in a clockwise manner so that the opening 192 cams against and locks the rod 194 from moving in the vertical or longitudinal direction.

Referring now to FIGS. 20 and 21, when the lever 208 is moved upwardly the spring 200 is compressed and the rod and arm 196 are rotated upwardly in a counter-clockwise manner; thus, releasing contact of the cam opening with rod 194. The compression spring rod is then unlocked and free to move in the longitudinal direction.

FIGS. 22–27 illustrate a seventh embodiment of the lock mechanism. Like components to those illustrated in FIGS. 1–6 are labeled with like numerals with a triple asterisk (*). This embodiment includes a lock mechanism in the form of a clamp assembly. A clamp housing 199 is positioned over the end of rod housing 24* and is secured thereto via a fastener or other suitable means. The housing has an opening 201 therein for receiving the clamp assembly 210 and the compression spring rod 214. A second opening 202 is formed in the housing approximately perpendicular to opening 201. Opening 202 is formed by housing 201 and wall 203 which is secured to an end of the housing via fasteners 204 or other suitable means. Opening 202 receives arms 216, 218 of the clamp.

Referring to FIG. 24, the clamp housing 201 has a preferably U-shaped wall 205 which is attached to wall 203 at two ends 206, 207 parallel to each other. The lock mechanism is in the form of a clamp assembly 210 with a wall or collar 211 forming an opening 212, preferably a C-shaped opening, which surrounds rod 214 of the compression spring assembly. The clamp has two arms 216, 218 extending from wall 211 which are parallel to each other and are spaced apart. Wedge shaped or tapered openings 220, 222 are formed within a wall of each arm 216, 218 and act to receive a wedge member 224. Wedge member 224 has a first end 225 which is connected to wire and cable assembly 228. A second end 227 includes a base with a shoulder 229 formed thereon. The wedge has tapered side walls and is received by opening 202. Wedge 224 is spring loaded via a spring 226 which extends over wedge 224 and is connected to a wire or cable assembly 228. The spring 226 is positioned between the shoulder and arms 216, 218. The wire or cable is in turn attached to a lever 230 which controls movement of the clamp and wedge assembly.

Figure 25:
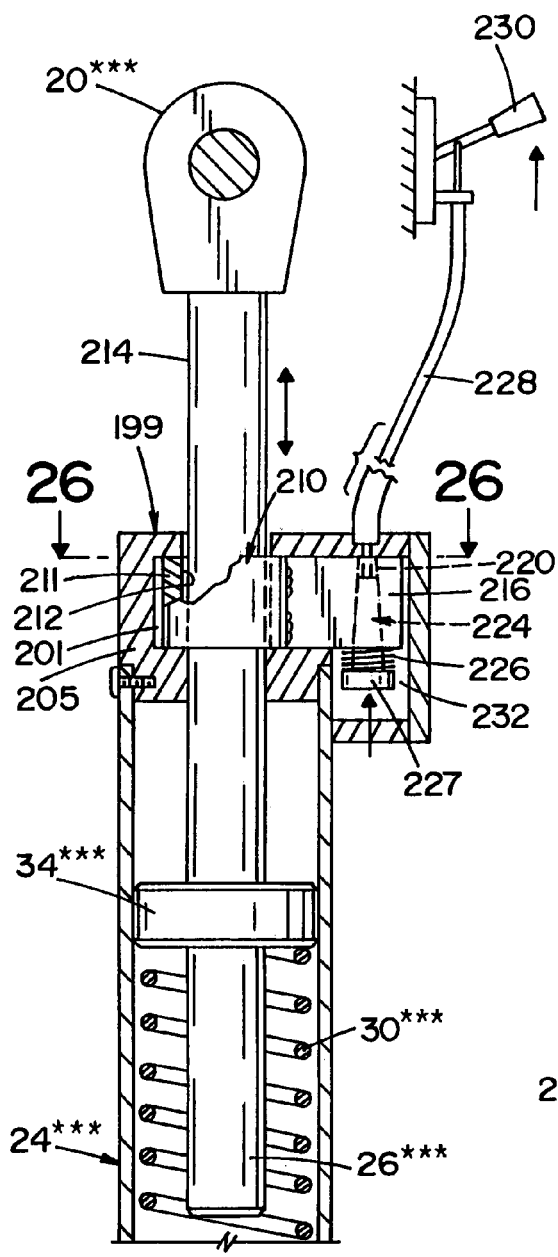
FIG. 25 is a side elevational view, in partial cross section, of a compression spring rod and locking mechanism of FIG. 22 in an unlocked position.
Figure 26:
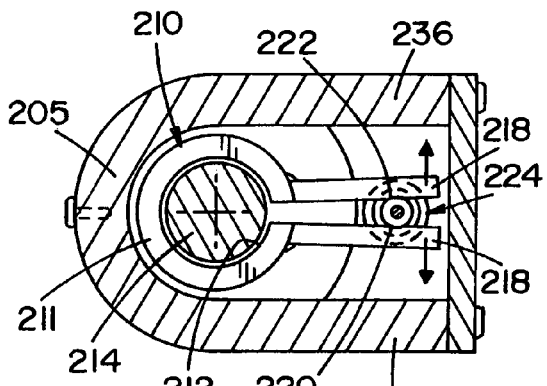
FIG. 26 is a top plan view, in partial cross section, along lines 26—26 of the locking mechanism of FIG. 25.
Figure 27:
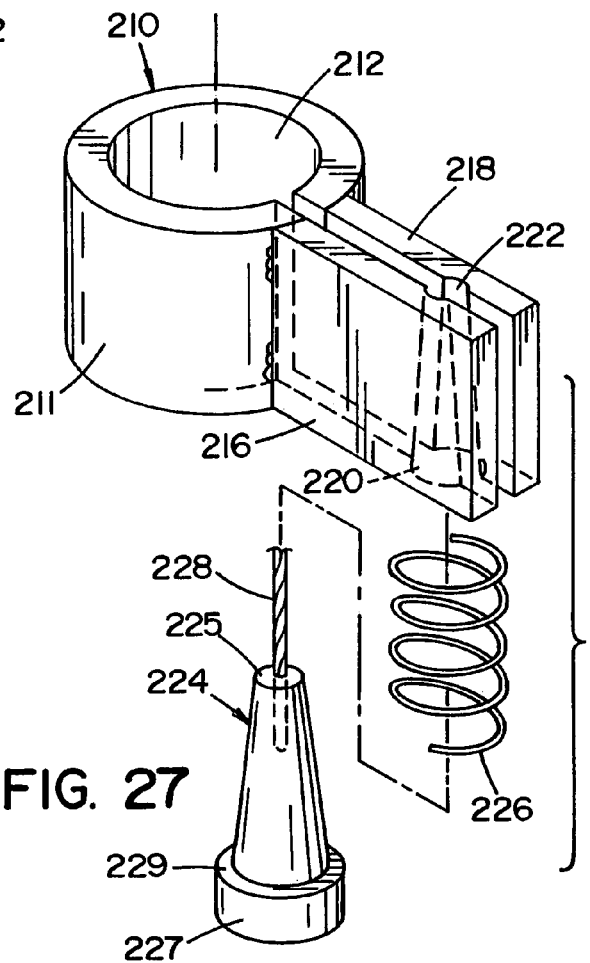
FIG. 27 is an exploded perspective view of the clamp locking mechanism of FIG. 25.

Referring now to FIGS. 22–24, the clamp is shown in a locked position. Wall 211 is clamped onto rod 214 and prevents the rod from moving in an axial direction. The spring 226 is in an extended position and the wedge shaped member 224 is not in contact with wedge-shaped openings 220, 222 of clamp arms 216, 218. The clamp arms 216, 218 are positioned parallel to each other. The lever 230 is in the down or disengaged position. FIGS. 22–24 illustrate the clamp in a locked position. The clamp engages and locks the rod 214 into position and prevents it from moving. The spring 226 is biased to release the wedge 224 from contacting the clamp openings 220, 222. Referring now to FIGS. 25–26, when lever 230 is pulled upwardly, the wedge 224 is pulled upwardly by wire 228 into contact with wedge-shaped openings 220, 222, thus compressing spring 226 between opening 202 and shoulder 229 and pushing apart clamp arms 216, 218 away from each other and releasing the rod 214 from engagement with clamp opening 212. The compression spring rod is then free to move in the axial direction.

While considerable emphasis has been placed herein on the structures and configurations of the preferred embodiments of the invention, it will be appreciated that other embodiments, as well as modifications of the embodiments disclosed herein, can be made without departing from the principles of the invention. In this respect, it will be appreciated that the spring rod can be used in applications other than those disclosed herein. Similarly, multiple combinations of coaxial and surrounding springs (i.e., three, four, etc.) may be configured to meet the desired load versus deflection for a particular application. Likewise, it will be appreciated that a spring rod according to the invention can be secured to relatively displaceable components in any number of different ways. The use of the compression spring rod and the locking mechanisms described hereinabove can be used in other applications beyond a tilt steering wheel column. Furthermore, a steering wheel column of a passenger car, truck or other vehicle can use the compression spring rod and locking mechanisms as described above. These and other modifications of the preferred embodiments, as well as other embodiments of the invention, will be obvious and suggested to those skilled in the art from the disclosure herein, whereby it is to be distinctly understood that the foregoing descriptive matter is to be interpreted merely as illustrative of the present invention and not as a limitation thereof.

The invention claimed is:

1. A positive lock mechanism assembly, comprising:
a compression spring rod assembly comprising a housing having a longitudinal axis and axially opposite ends;
a rod member coaxial with said longitudinal axis and having an inner end in said housing and an outer end axially outwardly of one of said opposite ends;
said rod member comprises at least one slot between said inner and outer ends thereof;
a guide member on said inner end of said rod member for supporting said rod member during movement of said rod member;
a pair of compression springs extending between said guide member and one of said opposite ends of said housing; and
a pin having a first portion which is selectively inserted into said at least one slot for preventing movement of said rod member in a longitudinal direction, said pin extending within an opening in a housing member mounted adjacent one of said opposite ends of said housing, said pin having a second portion surrounded by a spring for biasing said pin in a locking position.

2. The positive lock mechanism assembly of claim 1, wherein said pin first portion has a diameter greater than said pin second portion.

3. The positive lock mechanism assembly of claim 2, wherein said pin is attached to a cable for selectively moving said pin.

4. The positive lock mechanism assembly of claim 3, further comprising a lever operably connected to said cable for controlling movement of said pin.

5. The positive lock mechanism assembly of claim 1, wherein said at least one slot comprises a plurality of slots equally spaced apart along a length of said rod member.

6. The positive lock mechanism assembly of claim 1, wherein said pin comprises hardened steel.

7. The positive lock mechanism assembly of claim 1, wherein a direction of winding of one of said pair of compression springs is opposite to a direction of winding of another of said pair of compression springs.

8. The positive lock mechanism assembly of claim 1, wherein an outside diameter of one of said pair of compression springs is less than an outside diameter of another of said pair of compression springs.

9. The positive lock mechanism assembly of claim 1, further comprising a bushing adjacent said one of said opposite ends supporting said rod member for reciprocation axially of said housing between extended and retracted positions relative thereto.

10. The positive lock mechanism assembly of claim 9, wherein said pair of compression springs extend between said guide member and said bushing coaxial with said axis for biasing said rod member toward the extended position thereof.

11. The positive lock mechanism of claim 1, further comprising a mounting member having an opening for receiving said pin, said mounting member being mounted adjacent one of said axial ends of said housing.

12. A tilt steering lock assembly comprising:
a tilt steering column comprising a first tilt section and a second tilt section, wherein said first tilt section is operated by a manual lever connected thereto;
a compression spring rod assembly comprising:
a housing having a longitudinal axis and axially opposite ends;
a pair of compression springs extending between said housing at axially opposite ends;
a rod member coaxial with said longitudinal axis and having an inner end in said housing adjacent said compression springs and an outer end axially outwardly of one of said opposite ends;
said rod member comprises at least one slot between said inner and outer ends thereof; and,
a pin having a first portion which is selectively inserted into said at least one slot for preventing movement of said rod in a longitudinal direction, and a second portion, coaxial to said first portion, which is surrounded by a spring.

13. The tilt steering lock assembly of claim 12, wherein said pin first portion has a greater diameter than said second portion of said pin.

14. The tilt steering lock assembly of claim 12, wherein said pin is attached to a cable for moving said pin.

15. The tilt steering lock assembly of claim 12, further comprising a lever operably connected to said cable for controlling movement of said pin.

16. The tilt steering lock assembly of claim 12, wherein said at least one slot comprises a plurality of slots equally spaced apart along a length of said rod member.

17. The tilt steering lock assembly of claim 12, wherein a direction of winding of one of said pair of compression springs is opposite to a direction of winding of another of said pair of compression springs.

18. The tilt steering lock assembly of claim 12, wherein an outside diameter of one of said pair of compression springs is less than an outside diameter of another of said pair of compression springs.

* * * * *